United States Patent
Webb

[15] 3,675,354
[45] July 11, 1972

[54] SLIDE VIEWER

[72] Inventor: Albert E. Webb, Glenview, Ill.

[73] Assignee: General Aniline & Film Corporation, New York, N.Y.

[22] Filed: March 18, 1970

[21] Appl. No.: 20,746

Related U.S. Application Data

[62] Division of Ser. No. 718,581, April 3, 1968, abandoned.

[52] U.S. Cl. .................................................. 40/63 A
[51] Int. Cl. .................................................. G09f 11/30
[58] Field of Search ........................... 40/63 A, 64 A, 106.1

[56] References Cited

UNITED STATES PATENTS

| | | | |
|---|---|---|---|
| 1,504,989 | 8/1924 | Spitzer | 40/63 A X |
| 2,516,270 | 7/1950 | Swain | 40/106.1 |
| 2,529,052 | 11/1950 | Sherwood | 40/63 A |
| 1,808,176 | 6/1931 | Pieper et al. | 40/63 A X |
| 1,463,624 | 7/1923 | Mabee | 40/63 A |
| 1,639,702 | 8/1927 | Porak | 40/63 A X |

FOREIGN PATENTS OR APPLICATIONS

| | | | |
|---|---|---|---|
| 947,228 | 1/1964 | Great Britain | 40/64 A |
| 1,008,973 | 5/1952 | France | 40/63 A |

*Primary Examiner*—Robert W. Michell
*Assistant Examiner*—Richard Carter
*Attorney*—McDougall, Hersh & Scott

[57] ABSTRACT

The viewer contains adjustable magnification means including a movably mounted lens shiftable in either direction along the optical axis by a manually operated control knob, thereby adapting the viewer to accommodate slides having image bearing or transparency portions of varying sizes. The viewer is swingably mounted in a U-shaped stand or support. The viewer may be swung to a plurality of operative positions and also to an inverted position wherein the exposed or fixed lens of the viewer is disposed between the legs of the U-shaped stand adjacent the bight portion thereof.

1 Claim, 5 Drawing Figures

PATENTED JUL 11 1972 3,675,354
SHEET 1 OF 3
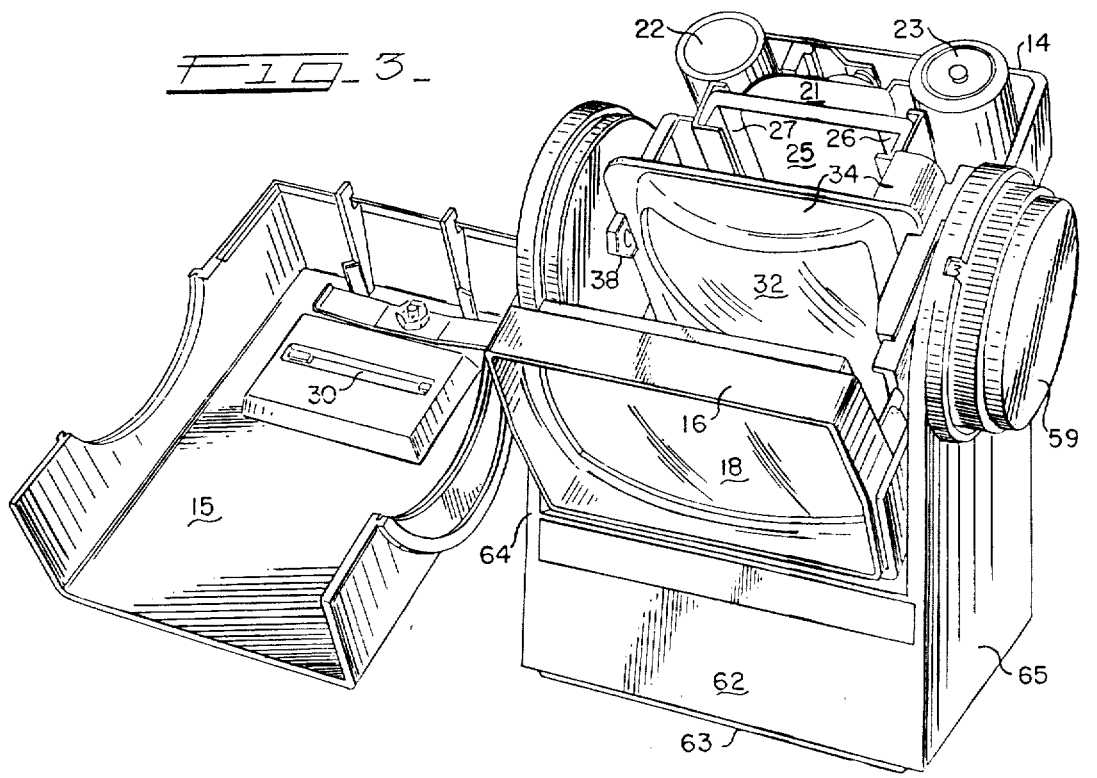
FIG_3_
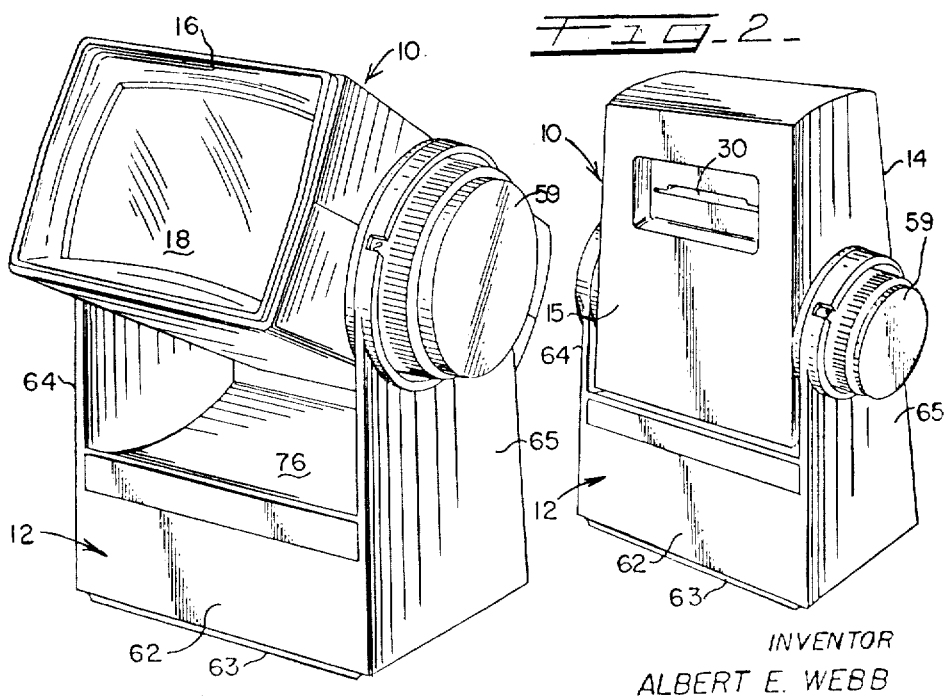
FIG_2_
FIG_1_
INVENTOR
ALBERT E. WEBB
BY McDougall, Hersh + Scott
ATT'YS.

INVENTOR
ALBERT E. WEBB
BY McDougall, Hoeth & Scott
ATT'YS.

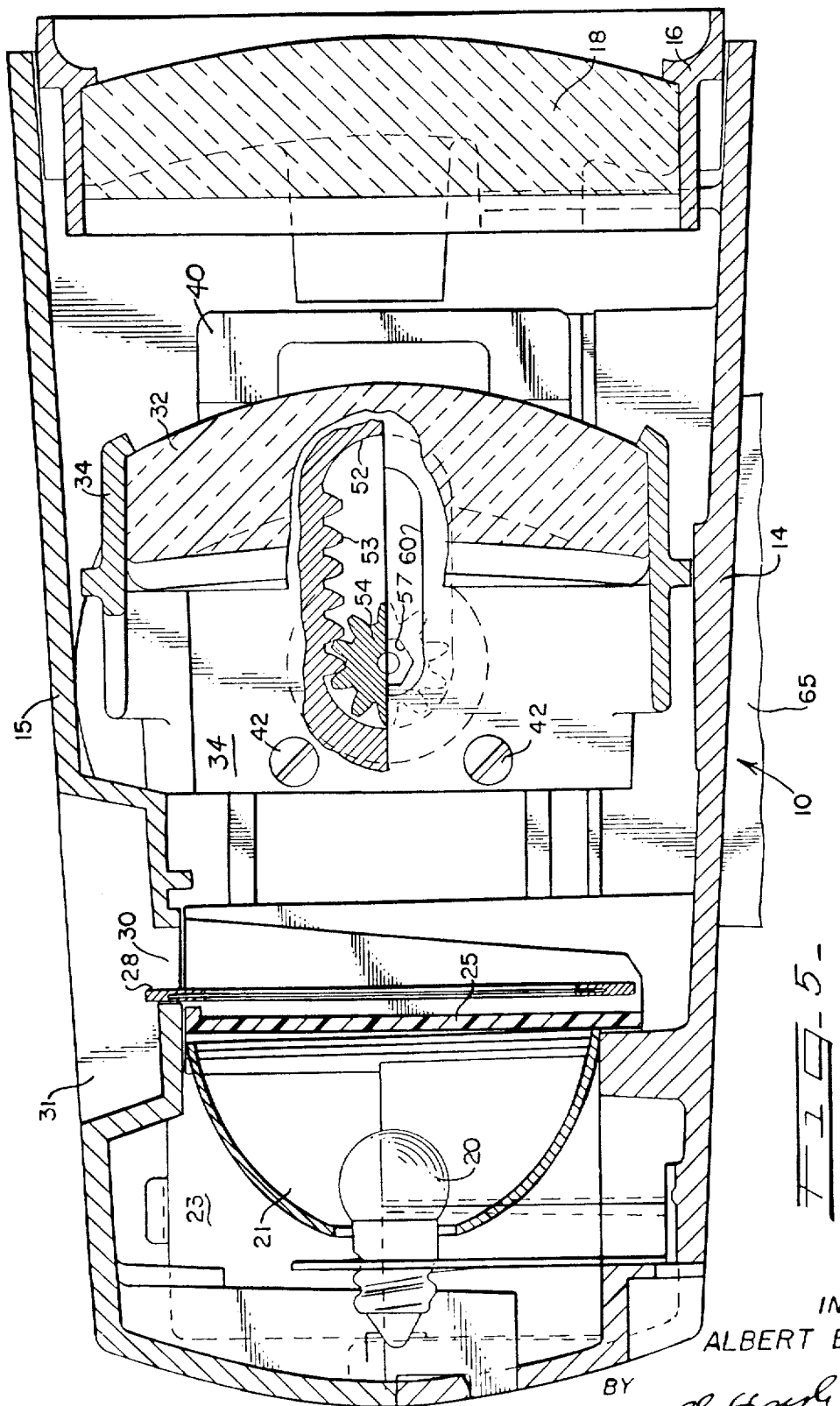

SLIDE VIEWER

OBJECTS OF THE INVENTION

This application is a division of my application, Ser. No. 718,581, filed Apr. 3, 1968, now abandoned.

A primary object of the present invention is the provision of a viewer including a U-shaped stand or support which mounts the viewer for swinging movement to a plurality of operative positions and also to an inverted position wherein the exposed lens of the viewer is disposed between the legs and adjacent the bight portion of the stand.

Another object of the present invention is the provision of a new and improved slide viewer having manually operated control means adapting the viewer to accommodate slides having image bearing portions of varying sizes.

Still another object of the invention is the provision of a viewer of the type described, wherein said viewer includes a lens arranged for reciprocal movement along the optical axis by means of a rack and pinion type of drive, the pinion being rotated by a manually operated control knob.

These and other objects and advantages of the invention will become apparent from the following specification disclosing a preferred embodiment which is shown in the accompanying drawings.

DESCRIPTION OF THE DRAWINGS

FIG. 1 is a perspective view of the slide viewer showing the same in one of its operative positions;

FIG. 2 is a perspective view of the viewer showing the same in the inverted position;

FIG. 3 is an enlarged perspective view of the viewer with the top housing shell removed for purposes of better illustration;

FIG. 5 is a section taken along the line 5—5 of FIG. 4.

DESCRIPTION OF A PREFERRED EMBODIMENT

Figure 4:
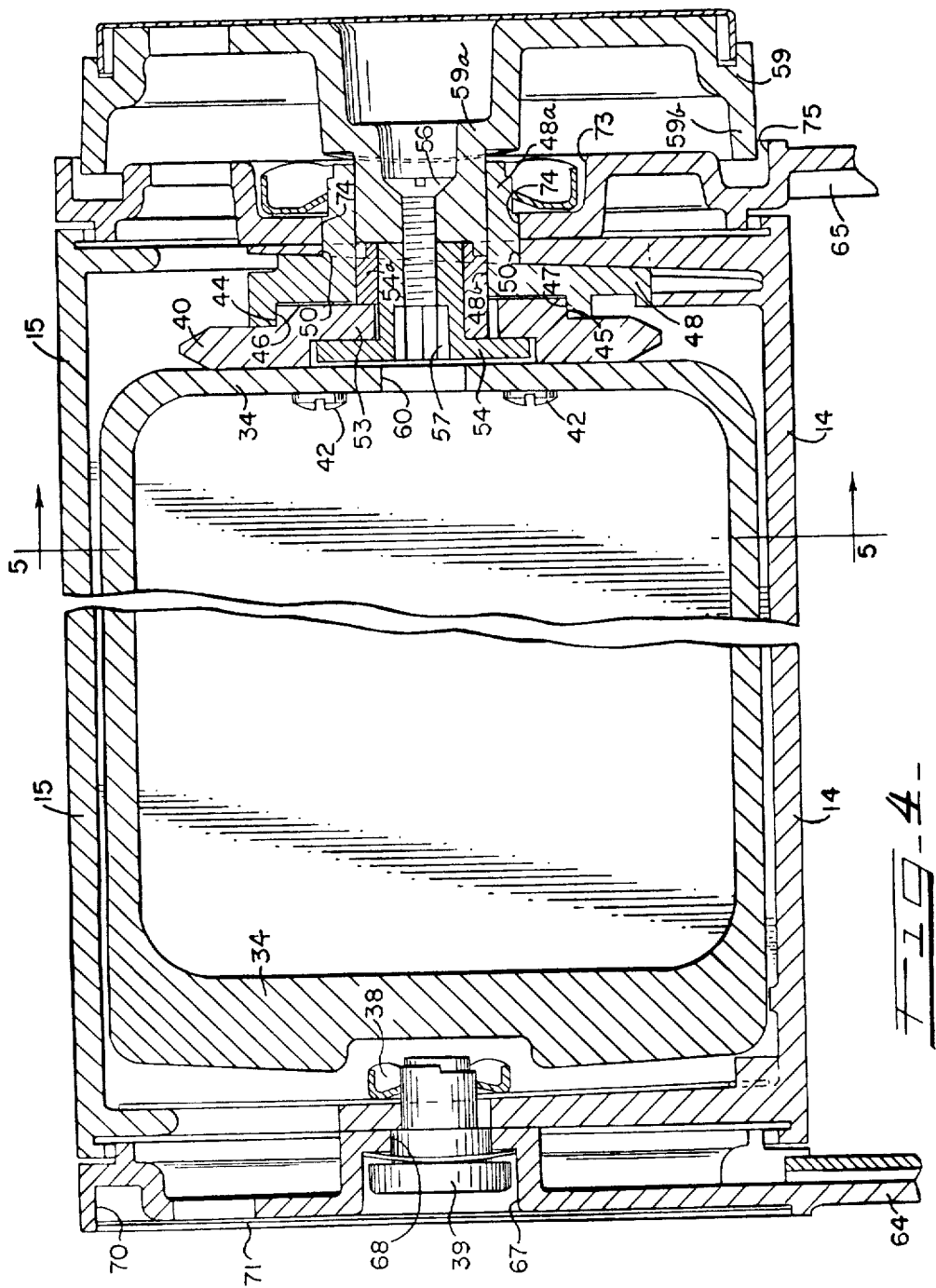
FIG. 4 is an enlarged transverse section taken through the viewer.

The slide viewer according to the present invention includes a main housing, generally designated 10, swingably mounted by a U-shaped frame or stand, generally designated 12. The housing 10 may be formed by two shell portionS 14 and 15 suitably connected together and having corresponding open ends adjoining with an open rectangular frame 16; this frame supports a magnifying lens 18 which defines one wall of the housing 10.

The viewer housing 10 contains a small bulb 20 mounted within a reflector 21 for being energized from a pair of flashlight batteries 22 and 23 through an appropriate circuit (not shown). Mounted immediately in front of the reflector 21 is a light diffusing plate 25, the latter being preferably made of plastic. Suitable slide holding means including a pair of opposed tracks 26 and 27 (FIG. 3) are provided for receiving a slide 28 and holding the same forwardly of the diffusing plate 25. These guide tracks open into a slot 30 formed in the housing shell 15 in a cavity 31 therein, such cavity permitting the user's fingers to grasp a top marginal portion of the slide 28 to remove the same from the viewer.

The viewer further includes a lens 32 secured in a frame 34, which frame is mounted for reciprocal movement along the optical axis of the viewer, this axis being defined by a line perpendicular to the diffusing plate 25 and coaxial with the central axis of the bulb 20. A plate member 40 is secured to one side of the frame 34, as by means of a number of fasteners 42. This plate includes integral guide surfaces 44, 45 which slidably engage respective guide surfaces 46 and 47 formed on a member 48, the latter having a hub portion 48a snugly received in an aperture 50 formed in the shell 14.

It will be understood that all of the guideway surfaces just mentioned extend in parallel relation with the optical axis. It will be appreciated the lens 32 is mounted for reciprocal sliding movement in either direction along the optical axis of the viewer.

Plate 40 includes a horizontally elongated opening 52 forming teeth 53 defining a linear gear rack. These teeth are in meshing engagement with the teeth 54a of a pinion gear 54, which gear is engaged with a hub portion 59a by means of a spline connection, this hub portion being integral with the knob 59. A screw 56 connects the knob to the gear 54. An opening 60 is provided in one side of the frame 34 to allow access of a tool with a hexagonal formation 57 in the gear 54, which tool is used to prevent rotation of the gear during tightening of the screw 56. The hub portion 59a of the knob is rotatably mounted within the central bore 48b of the member 48. It will be understood that rotation of the knob 59 imparts corresponding rotation to the pinion gear 54, such movement in turn imparting movement to the lens 32 in a direction along the optical axis depending on the direction of rotation on the knob 59.

The movable lens 32 adapts the viewer to accomodate not only so-called standard 35 mm slides, but also Super slides as well as Instamatic brand slides. Super slides have the mounts or frames thereof, either of cardboard or plastic construction, with external or over-all dimensions the same as a standard 35 mm slide. However, a Super slide has a transparency or image bearing portion somewhat larger than the transparency portion of a standard slide. An Instamatic slide has the same over-all dimensions as the standard slide, but the image bearing or transparency portion thereof is considerably smaller than the transparency portion of a standard slide. Movement of the lens 32 in an appropriate direction by manipulation of the knob 59 will adjust the magnification power of the viewer to accomodate all of the slides just mentioned. Movement of the lens 32 toward the fixed lens 18 increases the magnification to accomodate an Instamatic slide. The lens 32 is moved rearwardly to a so-called neutral position when a standard slide is viewed and then rearwardly a greater extend when a Super slide is viewed.

At this time it should be mentioned the circuit for the bulb 20 may be provided with a suitable switch to energize the bulb when a slide is inserted in the slot 30 for viewing. Such switch may be of the type operated by the presence of a slide, as shown in Miller U.S. Pat. No. 2,720,045, or alternatively, the diffuser plate may be movably mounted for actuating a switch as shown in Clarkson et al. U.S. Pat. No. 3,153,293.

The stand or frame 12 is of U-shape including a bight portion 62 havinG a planar base surface 63 for supporting the legs 64 and 65 of the stand in vertical relation. As noted in FIG. 4, the upper portion of the leg 64 includes a central, cylindrical recess 67 and a coaxial, reduced in diameter bore 68 receiving the pin 39. The uPper end of the leg 64 is provided with an annular recess 70 in which a circular plate 71 is mounted, thereby providing the viewer with an outward shape or configuration which is generally symmetrical with respect to a vertical plane containing the optical axis.

The upper of the leg 65 is provided with a central recess 73 coaxial with a reduced in diameter bore 74 which rotatably receives the hub portion 48a of the member 48. The leg 65 also includes a circular recess 75 for receiving an annular flange portion 59b of the knob 59.

It will be understood that the legs 64, 65 mount the viewer housing 10 for swinging movement about a horizontal axis which is perpendicular to a plane containing the optical axis of the viewer. This pivotable support provided by the legs 64 and 65 permits a user to position the housing 10 in any one of a number of positions for convenient viewing.

As seen in FIG. 1, the bight portion of the stand 12 includes an upper surface 76 which is in vertical spaced relation from the base surface 63. The surface 76 is of concave shape and is substantially coextensive with and in close proximity to the exposed face of the lens 18 when the housing 10 is swung to the inverted position shown in FIG. 2. This feature serves as a protective means for the lens 18 thereby minimizing the possibility of the latter being scratched or scored when not in use. The relationship between the configuration of the housing 10 and stand 12 provides the viewer with an especially attractive appearance when in the inverted or inoperative position, as is evident from FIG. 2.

While the invention has been shown in but one form it will be obvious to those skilled in the art it is not to be so limited. On the contrary, the invention is susceptible of various forms and modifications without departing from the spirit and the scope of the appended claims.

I claim:

1. In combination, a slide viewer generally rectangular housing defined in part by a generally rectangular viewing lens is positioned at one end of said housing for magnifying a film transparency being viewed; a stand for said housing generally rectangular base and spaced apart legs upwardly extending from the base; said base including a generally upwardly facing rectangular surface extending between the legs and having an area at least as large as the approximate area of the viewing lens; and means pivotably mounting said housing at a midpoint thereof to the upper ends of said legs for pivotal movement back and forth between an operative position to permit viewing of said lens and an inoperative position to cover said lens; said lens said upwardly facing rectangular surface of said base being concave, the axis of the concave surface being concentric with the pivot axis of said housing whereby is substantially coextensive with, and in close proximity to, said rectangular surface in said inoperative position and the housing and the base forming a substantially coextensive unit.

* * * * *